Dec. 1, 1931.  R. S. TROTT  1,834,907
ENGINE MOUNTING
Filed May 27, 1929
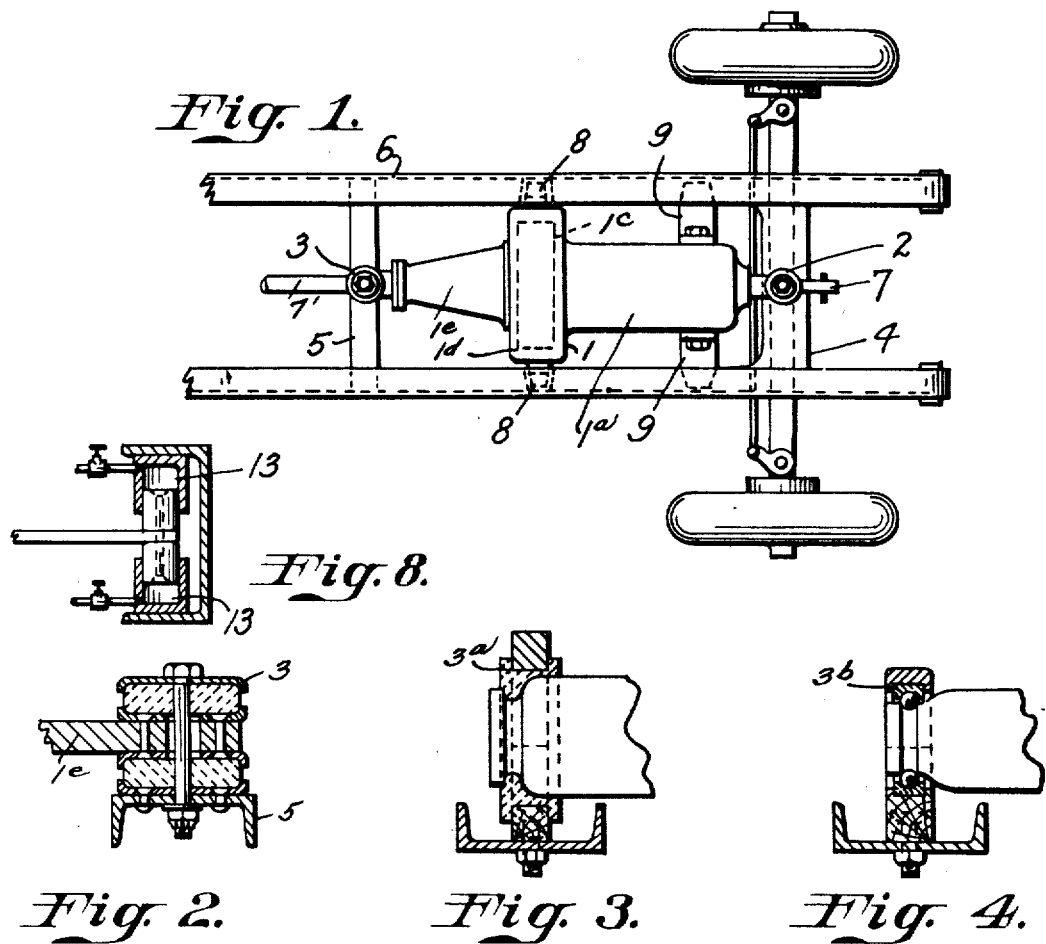
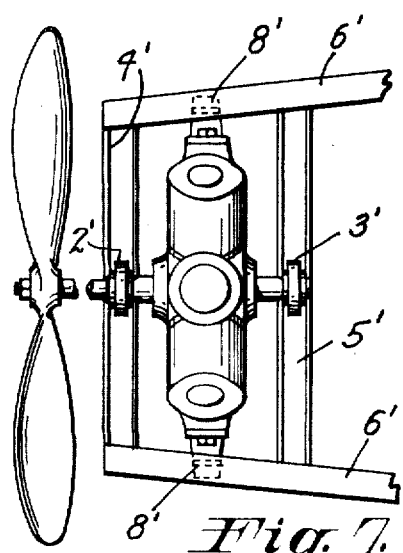
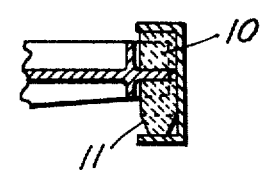
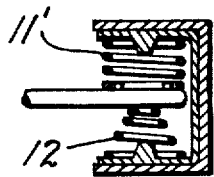
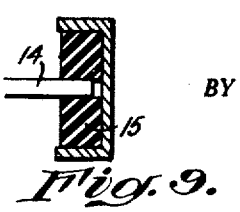
INVENTOR.
Rolland S. Trott
BY
ATTORNEY.

Patented Dec. 1, 1931

1,834,907

UNITED STATES PATENT OFFICE

ROLLAND S. TROTT, OF DENVER, COLORADO

ENGINE MOUNTING

Application filed May 27, 1929. Serial No. 366,406.

My invention relates to engine mountings for engines having torque variation during a revolution and more especially for internal combustion engines of motor vehicles and air and marine craft.

When an engine delivers power, the power impulse during an entire revolution is generally a variable quantity.

And when an internal combustion engine delivers power, there is a variation in the torque due to the variation in cylinder pressure after each explosion and to the interval between the explosions in different cylinders.

In a six cylinder or an eight cylinder engine this variation is minimized because of the fact that the power thrusts delivered to the crankshaft from the separate explosions overlap, but there is a torque variation nevertheless even though it is not as pronounced as in the case of a four cylinder engine. In the four cylinder internal combustion there is a slight interval between the power thrusts delivered to the crankshaft by the separate explosions.

That is, the separated power impulses of the four cylinder engine produce a greater torque variation than is present in any engine in which the power thrusts from the explosions overlap.

In any case, however, the variable torque, which naturally is much more noticeable at the slower engine speeds, produces a variable torque reaction upon the engine, which in turn produces a variable torque reaction upon the engine mounting.

This variable torque reaction upon the engine mounting in a motor vehicle, or air or marine craft, results when small, in engine sensation or torque sensation as distinct from vibration due to the movement of the parts of the engine, and when large, results in vibration or tremor such as found in air and marine craft especially.

In the endeavor to eliminate this engine sensation and tremor, the practice in some cases is to mount the engine upon its support in rubber mountings of various designs.

These rubber mountings, however, carry the weight of the engine, and generally of the entire power plant unit. And because, for safety, the engine must be positively held in place on its supports, the rubber of the mountings is further compressed by the mounting bolts, so that though the engine may be mounted in rubber, there is comparatively little resilience in the mounting, and the results of the torque variation are only slightly reduced thereby.

The object of this invention is to provide an engine mounting which will absorb the forces incident to the operation of the engine and which will hold the engine in place upon its support but will nevertheless provide ample resilience in so far as the absorption of the torque reaction is concerned.

I accomplish this object by providing pivotally resilient mounting means between the engine or power plant unit and its support adapted to carry substantially all of the weight but to transmit substantially none of the torque reaction; and a second means or torque connection between the engine or power plant unit and its support adapted to transmit the torque reaction but to carry substantially none of the weight.

All of this is fully described below and is illustrated in the drawings, in which:—

Figure 1 is a plan view of a power plant unit and the support upon which it is mounted.

Figure 2 is a sectional view of one form of pivotal mounting.

Figure 3 is a sectional view of another form of pivotal mounting.

Figure 4 is a sectional view of another form of pivotal mounting.

Figure 5 is a sectional view of one form of torque connection between the power plant and its support.

Figure 6 is a sectional view of another form of torque connection between the power plant and its support.

Figure 7 is a plan view of a power plant unit of an air craft, and its support.

Figure 8 is a sectional view of another form of torque connection.

Figure 9 is a sectional view of still another form of torque connection.

Figure 1 shows the main essentials of my invention. A power plant unit 1 is shown as composed of the usual engine 1ª having the crank-shaft 7 connected with the fly-wheel 1ᶜ and a fly-wheel casing 1ᵈ, and to which is fixed the transmission 1ᵉ. The power plant unit 1, is pivotally mounted as indicated at 2 and 3 upon the cross members 4 and 5 respectively of the support or frame 6. The usual drive-shaft 7' is connected with the transmission by the usual universal joint which in Fig. 1 is under the cross-member 5 and not shown.

These mountings are adapted to carry substantially the entire weight of the power plant unit and are to be strong enough and reliable enough so that the power plant unit will be securely attached to the support at these two points in such a manner as to permit pivotal movement of the unit of an approximately orbital nature with respect to the support without any question arising as to the security and safety of the mounting.

The power plant unit in air craft may or may not include the propeller; in a motor vehicle, it may or may not include the transmission; and in marine craft it may or may not include the reversing gear or mechanism, depending in any case upon the particular design and construction and requirements in question.

As shown by Figures 2, 3, and 4, either front or rear pivotal mounting may be of a rubber construction designated 3ª in Fig. 3, a plain pivotal bearing construction by the substitution of metal for the rubber shown in Figure 3, or an anti-friction ball or roller bearing construction 3ᵇ as indicated in Figure 4. The mounting of the unit on resilient supports at one or both ends, supports the unit for an approximate floating action responding to the impulses of the engine.

These pivotal mountings may be concentric with the crankshaft 7 of the engine, or vertically or laterally spaced therefrom within reasonable limits, and depending on conditions and requirements.

That is, if not concentric with the engine shaft, these pivotal mountings may be located in the longitudinal central vertical plane of the power plant unit if the weight thereof will thus be balanced, or laterally off center in either direction if the weight of the power plant unit is not equally distributed on either side of said plane.

Or, if it is desired to use part of the weight of the power plant unit to oppose the torque reaction or to add to this reaction, these pivotal mountings may be laterally offset an amount in the proper direction to give the result desired.

However, I prefer mountings at both ends of the power plant unit to be as near as practical to concentric with the engine crankshaft, and that they shall carry substantially the entire weight of the power plant unit. When the pivoted mountings are concentric with the engine crank-shaft, the engine unit oscillates in or on the mountings incident to the operation of the engine, and about an axis coincident with the axis of the engine crankshaft.

A torque connection or stabilizer is provided between the power plant and the support or frame, and in a motor vehicle or in either a marine craft unit with enclosed fly-wheel, this stabilizer may be conveniently mounted on the flywheel housing where the usual engine mounting arms are located, as indicated at 8 in Figure 1, or the connection may be made by the use of one or more braces 9 properly attached to the power plant unit at any other point, which may be used either in addition to or in place of those indicated at 8.

I prefer but two of these torque connections, one on each side, so that the torque may be transmitted equally to both side frame or support members, but naturally even one of these two connections may be eliminated if the remaining one is made rugged enough to transmit the entire torque reaction alone.

The torque reaction may be transmitted to the support or frame side members from the power plant unit by rubber cubes as shown at 10, by rubber blocks 11, formed as truncated pyramids so as to provide progressively increasing resistance and cushioning, by coiled springs 11', by conical coil springs 12, by a hydraulic or pneumatic device 13, by any combination of any or all of the above as by a leaf 14 disposed between rubber blocks 15 as shown in Fig. 9, or by any other construction which will provide a resilient engagement between the engine or power plant unit and the support or frame. In any case the construction and speed of action of the torque cushioning connection should be so proportioned to the engine torque and speed as to provide a torque reaction upon the support or frame which is as nearly as possible constant in value.

Use of hydraulic or pneumatic cushions will probably be limited to large steam or internal combustion engines of ships such as ocean liners, and may be combined with hydraulic or other shock absorber devices to prevent or control the pivotal action during storms; but in any event the essentials involved will not be changed by the size of the installation.

The action and operation of my invention is as follows;—When the engine is not running the weight of the power plant is carried substantially by the pivotal mountings, the torque connections merely acting to overcome any lack of perfect balance on these mountings.

In special cases or for special results a positive or negative load may be put upon the torque connections, but the main results will be substantially as explained below in any case.

When the engine is running and pulling, the torque effect is transmitted and its variations largely absorbed by the resilient connections between the power plan unit and its support or frame.

In a motor vehicle or marine craft, should a change speed transmission separate from the engine be employed, then generally the engine alone will be pivotally mounted upon the support or frame, though this is of course a matter of choice.

But, for motor vehicles at least, I prefer the unit power plant construction however the connection between the engine and the change speed transmission is accomplished. By having the transmission fixed to the engine, and the mountings located at the outer ends of the engine and transmission the entire weight of the engine and transmission is suspended between them so that no overhung weight is carried by either mounting, and whip action of the unit due to overhang is eliminated. But the separate mounting of the transmission upon the frame will not alter the essentials of the torque cushioning mounting of the engine.

In any sort of installation, however, parts connecting with the engine such as radiator hose, radiator, exhaust pipe, gasoline and oil pipes, and ignition or other equipment, must either be mounted to move as a unit with the engine in its pivotal movements, or must be mounted and constructed so as to permit such movement without harm. The same conditions naturally hold for air or marine craft.

Since all of the above parts and equipment ordinarily used with engines of all sorts are well known and do not constitute the novelty of this invention they are not shown nor further described herein.

I am well aware that there are various modifications which may be made in my invention to suit various conditions, constructions and proportions, and that the torque connections between power plant unit and the support or frame may carry part of the power plant weight, or may even be so set as to place additional load upon the pivotal mountings, as indicated above.

In fact I am aware that under some sets of conditions and with properly operating and proportioned cushions of whatever construction or type, satisfactory results might be obtained by pivotal mountings adapted to act merely as guides and to carry little if any of the weight, substantially all of which would be carried on the cushion torque connections.

But I consider all such matter to be within the scope of my invention, being substantially mechanical equivalents differing only in dimensions or proportions and with the main characteristics essentially the same, so what I claim as new, and desire to protect by Letters Patent is as follows:—

1. The combination with a motor vehicle frame and an engine unit, of two spaced mountings supported on the frame and carrying the engine unit and providing for orbital movement between the engine unit and the frame of the vehicle under the impulses incident to the operation of the engine unit, at least one of said mountings being non-metallic and resilient, the longitudinal center of gyration and axis of rotation of the engine crank-shaft aproximately coinciding at at least one point, said other mounting providing a limited degree of angular movement for one end of said unit and a resilient stabilizing connection between the engine unit and the frame.

2. The combination with a motor vehicle frame and an engine unit which has a tendency to oscillatory movement during operation, of two spaced non-metallic and yieldable mountings supported by the frame upon which the engine unit is mounted, said mountings adapted to yield slightly to such tendency to oscillatory movement of the engine unit with respect to the frame under the impulses of the engine unit when in operation, the axes of the engine crank-shaft and of the oscillatory movement of the engine unit approximately coinciding at one end of the unit and a stabilizing connection between the engine unit and the frame.

3. The combination with a motor vehicle frame, and engine unit including an engine and a transmission, which has a tendency to oscillatory movement during operation, of longitudinally spaced non-metallic mountings on the frame of the vehicle and supporting the engine unit, one of said mountings being located adjacent to the end of the transmission remote from the engine and approximately concentric with the axis of the crank-shaft of the engine and the longitudinal center of oscillation of the engine unit, the other mounting being associated with the engine at the end remote from the transmission, and approximately in the central vertical plane of the frame, at least one of said mountings being resilient, and means forming a resilient and stabilizing connection between the engine unit and the frame.

4. The combination with a motor vehicle frame, and an engine unit including an engine and a transmission, of two spaced resilient non-metallic mountings located on the frame of the vehicle and supporting the engine unit at two points, one of said mountings engaging the transmission and providing approximately pivotal movement of the engine unit around an axis approximately coincident with the axis of the engine-shaft, the other mounting providing a support for the engine, and resilient means forming a stabilizing connection between the engine unit and the frame of the vehicle.

5. The combination with a motor vehicle frame, and an engine unit including an engine and a transmission, of two spaced resilient non-metallic mountings located on the frame of the vehicle and supporting the engine unit at two points, one of said mountings engaging the transmission and providing approximately pivotal movement around an axis approximately coincident with the axis of the engine-shaft, the other mounting supporting the engine at a point remote from the transmission, and resilient means forming a stabilizing connection between the engine unit and the frame of the vehicle.

6. The combination with a motor vehicle frame and an engine unit including an engine and a transmission, of longitudinally spaced non-metallic mountings on the frame of the vehicle upon which the engine unit is supported, one of said mountings engaging the transmission adjacent to the rear end and providing approximately pivotal movement of the unit about an axis approximately concentric with the axis of the engine shaft at at least one point, the other mounting being resilient and disposed in the central vertical plane of the frame and supporting the engine, and means forming a stabilizing connection between the engine unit and the frame of the vehicle.

7. The combination with a motor vehicle frame and an engine unit, each end of which unit has a single mounting supported on the frame and upon which the extreme ends of the engine unit are supported, at least one of said mountings being non-metallic and elastic and arranged to provide transverse movement of an end portion of the engine unit, and means connected with the engine unit and the frame for stabilizing the rolling tendency of the engine unit due to the impulses of the running engine unit about an axis, said axis adjacent at least one of said mountings being approximately coincident with the axis of the shaft of the engine unit.

8. The combination with a motor vehicle frame and an engine unit, of two rubber mountings supported on the frame on which the engine unit rests and forming supporting means for the engine unit, one mounting being approximately concentric with the axis of the engine-shaft, and means for stabilizing the rolling motion of the engine unit on the mountings due to the influence incident to the operation of the engine unit.

9. The combination with a motor vehicle frame, and an engine unit, having an engine and a transmission, of two resilient non-metallic mountings carried by the frame, and spaced at the two extreme ends of the unit, to carry approximately all of the weight of the engine and of the transmission between them and between facing sides of the mountings, whereby approximately no overhung weight is carried by either mounting, and whip action due to overhang is approximately eliminated, and a resilient stabilizing connection between the engine unit and the frame.

10. The combination with a motor vehicle frame and an engine unit having an engine and a transmission, of longitudially spaced rubber mountings upon which the engine unit is supported and movably held to respond to the impulses of the running engine, one of said mountings being approximately in the central vertical plane of the frame and supporting the front of the engine, one of said mountings being carried adjacent the end of the transmission remote from the flywheel of the engine, whereby the tendency to vibration present in the mass of the transmission, when not directly supported, is approximately eliminated, and a resilient connection between the engine unit and the frame.

11. The combination with a motor vehicle frame and an engine unit, of two spaced mountings supported by the frame and carrying the engine unit, one mounting being non-metallic and yieldable and having shock cushioning properties and so constructed and arranged as to provide for orbital movement of an end of the engine unit, the other mounting accommodating itself to the requirements of the orbital movement of the first-mentioned mounting, the joint action of the two mountings cushioning the movement due to torque impulses of the engine, and a stabilizing connection between the engine unit and the frame.

12. The combination with a motor vehicle frame and an engine unit, of two spaced non-metallic yieldable mountings supported by the frame approximately in the longitudinal central vertical plane of the engine unit and disposed adjacent the ends of the engine unit and carrying said engine unit, said mountings being so constructed and arranged as to provide for approximately orbital movement of the engine unit relative to the frame, and a stabilizing connection between the engine unit and the frame.

13. The combination with a motor vehicle frame and an engine unit having a unitary engine casing enclosing a fly-wheel and having a projection thereon of longitudinally spaced mountings carried by the frame and supporting the engine unit, at least one of said mountings being resilient and arranged to pivotally engage said projection, and also to provide a degree of movement in approximately all directions, said mountings being approximately in the longitudinal central vertical plane of the engine unit, and providing for movement of the engine unit with respect to the frame under impulses incident to the operation of the engine, the other of said mountings supporting the rear end of the engine unit by direct engagement with the unitary casing in a manner to provide limited universal movement, and spaced from and to the rear of the fly-wheel of the engine, whereby to have the advantage of the gyroscopic action of the fly-wheel for reducing the engine vibration transmitted to the rear mounting, and a stabilizing connection between the engine unit and the frame.

14. The combination with a motor vehicle frame, and a floating power plant, of two longitudinally spaced mountings supported by the frame approximately in the longitudinal central vertical plane of the power plant and carrying said power plant, at least one of said mountings being non-metallic and yieldable, said mountings being so constructed and arranged as to provide for approximately floating orbital movement of the engine unit relative to the frame under impulses due to the operation of the power plant, and a resilient stabilizing connection between the power plant and the frame.

In testimony whereof I affix my signature.

ROLLAND S. TROTT.

engine unit by direct engagement with the unitary casing in a manner to provide limited universal movement, and spaced from and to the rear of the fly-wheel of the engine, whereby to have the advantage of the gyroscopic action of the fly-wheel for reducing the engine vibration transmitted to the rear mounting, and a stabilizing connection between the engine unit and the frame.

14. The combination with a motor vehicle frame, and a floating power plant, of two longitudinally spaced mountings supported by the frame approximately in the longitudinal central vertical plane of the power plant and carrying said power plant, at least one of said mountings being non-metallic and yieldable, said mountings being so constructed and arranged as to provide for approximately floating orbital movement of the engine unit relative to the frame under impulses due to the operation of the power plant, and a resilient stabilizing connection between the power plant and the frame.

In testimony whereof I affix my signature.

ROLLAND S. TROTT.

DISCLAIMER 1,834,907.—*Rolland S. Trott*, Denver, Colo. ENGINE MOUNTING. Patent dated December 1, 1931. Disclaimer filed July 7, 1937, by the patentee.
Hereby enters this disclaimer to claim 2 of the Letters Patent.
[*Official Gazette August 10, 1937.*]

DISCLAIMER 1,834,907.—*Rolland S. Trott*, Denver, Colo. ENGINE MOUNTING. Patent dated December 1, 1931. Disclaimer filed July 7, 1937, by the patentee.
Hereby enters this disclaimer to claim 2 of the Letters Patent.
[*Official Gazette August 10, 1937.*]